US012214998B2

(12) United States Patent
Ye et al.

(10) Patent No.: US 12,214,998 B2
(45) Date of Patent: Feb. 4, 2025

(54) MECHANICAL ANTI-SWAY CONTROL METHOD FOR CRANES

(71) Applicant: Siemens Aktiengesellschaft, Munich (DE)

(72) Inventors: Fei Ye, Shanghai (CN); Jian Xu, Shanghai (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 74 days.

(21) Appl. No.: 17/922,419

(22) PCT Filed: Apr. 29, 2021

(86) PCT No.: PCT/EP2021/061282
§ 371 (c)(1),
(2) Date: Oct. 31, 2022

(87) PCT Pub. No.: WO2021/219797
PCT Pub. Date: Nov. 4, 2021

(65) Prior Publication Data

US 2023/0166946 A1 Jun. 1, 2023

(30) Foreign Application Priority Data

Apr. 30, 2020 (CN) ......................... 202010367338.6

(51) Int. Cl.
*B66C 13/00* (2006.01)
*B66C 13/06* (2006.01)
*B66C 13/22* (2006.01)

(52) U.S. Cl.
CPC ............ *B66C 13/063* (2013.01); *B66C 13/22* (2013.01); *B66C 2700/0385* (2013.01); *B66C 2700/08* (2013.01)

(58) Field of Classification Search
CPC ...... G05D 13/62; G05D 13/06; G05D 13/063; G05D 13/22; G05D 2700/08
See application file for complete search history.

(56) References Cited

U.S. PATENT DOCUMENTS 3,945,504 A * 3/1976 Wright .................... B66C 13/06 254/285
5,806,696 A * 9/1998 Hytonen ................. B66C 13/54 212/270

(Continued)

FOREIGN PATENT DOCUMENTS

CN 201864479 U 6/2011 ............. B66C 13/06
GB 1 284 985 8/1972
WO WO-2021219942 A1 * 11/2021 ............. B66C 13/22

OTHER PUBLICATIONS

Search Report for International Application No. PCT/EP2021/061282, 14 pages.

(Continued)

*Primary Examiner* — Emmanuel M Marcelo
(74) *Attorney, Agent, or Firm* — Slayden Grubert Beard PLLC

(57) ABSTRACT

Various embodiments of the teachings herein include methods for controlling a crane. The method may include: acquiring a first speed of a first motor pulling a first end of a hoist; acquiring a second speed of a second motor pulling a second end of the hoist opposite the first end; acquiring a first speed difference between the first speed and the second speed; acquiring a first speed difference threshold; and if the first speed difference is smaller than the first speed difference threshold, sending a control instruction to the first motor to increase a torque output value of the first motor in the trolley traveling direction.

18 Claims, 8 Drawing Sheets

(56) References Cited

U.S. PATENT DOCUMENTS

| | | | | |
|---|---|---|---|---|
| 6,135,301 | A | 10/2000 | Monzen | 212/275 |
| 6,598,859 | B1 * | 7/2003 | Kureck | B66C 13/23 254/362 |
| 2019/0193998 | A1 * | 6/2019 | Ladra | B66C 13/30 |
| 2024/0182278 | A1 * | 6/2024 | Post | B66C 13/40 |

OTHER PUBLICATIONS

Chinese Office Action, Application No. 202180006373.8, 8 pages, Dec. 12, 2024.

* cited by examiner

Prior Art

MECHANICAL ANTI-SWAY CONTROL METHOD FOR CRANES

CROSS-REFERENCE TO RELATED APPLICATIONS

This application is a U.S. National Stage Application of International Application No. PCT/EP2021/061282 filed Apr. 29, 2021, which designates the United States of America, and claims priority to CN Application No. 202010367338.6 filed Apr. 30, 2020, the contents of which are hereby incorporated by reference in their entirety.

TECHNICAL FIELD

The present application relates to the field of crane control. Various embodiments of the teachings herein include methods, devices, and/or systems for controlling a crane.

BACKGROUND

The hoist of a rail crane or a tire crane without anti-sway control may sway significantly when the trolley or cart of the crane travels. A driver needs to manually track the trolley or crane to reduce the amplitude of sway of the hoist; this anti sway operation affects the operational efficiency. In a mechanical anti-sway solution, four anti-sway motors are used to pull the four corners of the hoist through a steel wire rope to reduce the amplitude of sway of the hoist.

The existing mechanical anti-sway principle is shown in FIG. 1. For example, when the trolley accelerates in the negative direction of the x-axis (for example, the front direction of the trolley), the hoist sways in the positive direction of the x-axis, and motor a and motor b pull the hoist by an appropriate torque, thereby reducing the amplitude of sway of the hoist in the positive direction of the x-axis. Likewise, when the trolley travels in the positive direction of the x-axis (for example, the rear direction of the trolley), the hoist sways in the negative direction of the x-axis, and motor c and motor d pull the hoist with an appropriate torque, thereby reducing the amplitude of sway of the hoist in the negative direction of the x-axis; however, a specifically used control method is complicated, which makes it difficult to achieve good control results.

At present, for typical mechanical prevention of sway, the control method includes calculating the horizontal acceleration torque of the load. The four motors all output a small torque to pull the steel wire rope of the hoist so that it is tightly stretched. When the trolley travels alone, if it is accelerated in the negative direction of the x-axis (for example, the front direction of the trolley), the torque of motor a and of motor b is increased in a certain proportion on the basis of the total weight of the hoist and the load. At the end of the acceleration, the increased torque of motor a and motor b is removed, the torque of motor c and motor d is increased at the same time, and the time during which the torque needs to be maintained is roughly estimated or, on the basis of a pendulum cycle, roughly calculated; finally, the torque of the four anti sway motors is increased at the same time, and the time during which the torque needs to be maintained is adjusted by using the slope of the steel wire rope and on the basis of the actual effect.

When the cart travels alone, the same method is used. With this control method, the logic judgment procedure for various situations is complicated, and debugging needs to be performed repeatedly to change parameters. Moreover, when the driver controls operations by repeated sudden accelerations and decelerations, the effect of anti-sway control is poor, and even an exactly opposite effect is produced; in addition, when the hoist is operated in conjunction with a trolley or a cart, or when a trolley and a cart are operated in conjunction, the debugging becomes even more complicated.

SUMMARY

Some embodiments of the teachings of the present application include methods, devices, and/or systems for controlling a crane, as well as a storage medium and a processor, so as to at least solve the problem in the prior art that it is difficult to control the sway of the hoist of a crane during operation.

For example, some embodiments include a method for controlling a crane, characterized by comprising: acquiring a first speed value of a first motor (S201), the first motor being configured to pull a first end of the hoist of the crane, wherein, when the first end of the hoist moves toward the first motor, the first speed value is positive, and when the first end of the hoist moves away from the first motor, the first speed value is negative; acquiring a second speed value of the second motor (S203), the second motor being configured to pull a second end of the hoist of the crane, the second end being the opposite end of the first end in a trolley traveling direction of the crane, wherein, when the second end of the hoist moves toward the second motor, the second speed value is positive, and when the second end of the hoist moves away from the second motor, the second speed value is negative; acquiring a first speed difference between the first speed value and the second speed value (S205); acquiring a first speed difference threshold (S207); and if the first speed difference between the first speed value and the second speed value is smaller than the first speed difference threshold, sending a control instruction to the first motor to increase a torque output value of the first motor in the trolley traveling direction (S209).

In some embodiments, the method further comprises: acquiring a third speed value of a third motor (S401), the third motor being configured to pull a third end of the hoist of the crane, the third end being the opposite end of the first end in a cart traveling direction of the crane, wherein, when the third end of the hoist moves toward the third motor, the third speed value is positive, and when the third end of the hoist moves away from the third motor, the third speed value is negative; acquiring a second speed difference between the first speed value and the third speed value (S403); acquiring a second speed difference threshold (S405); and if the second speed difference between the first speed value and the third speed value is smaller than the second speed difference threshold, sending a control instruction to the first motor to increase a torque output value of the first motor in the cart traveling direction (S407).

In some embodiments, the method further comprises acquiring a first speed difference target value, wherein increasing a torque output value of the first motor in the trolley traveling direction comprises increasing a torque output value of the first motor until a first speed difference between the first speed value and the second speed value reaches the first speed difference target value.

In some embodiments, the method further comprises acquiring a second speed difference target value, wherein increasing a torque output value of the first motor in the cart traveling direction comprises increasing a torque output value of the first motor until a second speed difference between the first speed value and the third speed value reaches the second speed difference target value.

In some embodiments, the method further comprises acquiring an enable instruction, the enable instruction being used to allow a control instruction to be sent to the first motor to increase a torque output value of the first motor.

In some embodiments, the method further comprises acquiring a torque high limit and a torque low limit, wherein a torque output value of the first motor is limited to not exceed the torque high limit or the torque low limit.

In some embodiments, the method further comprises acquiring a proportional parameter and an integral time, wherein a torque output value of the first motor is regulated on the basis of the proportional parameter and the integral time.

In some embodiments, the method further comprises if the first speed difference between the first speed value and the second speed value is greater than zero, sending a control instruction to the first motor to reduce a torque output value of the first motor in the trolley traveling direction.

In some embodiments, the method further comprises if the second speed difference between the first speed value and the third speed value is greater than zero, sending a control instruction to the first motor to reduce a torque output value of the first motor in the cart traveling direction.

As another example, some embodiments include a device for controlling a crane, the device comprising: a first speed acquiring unit (101) configured to acquire a first speed value of a first motor, the first motor being configured to pull a first end of the hoist of the crane, wherein, when the first end of the hoist moves toward the first motor, the first speed value is positive, and when the first end of the hoist moves away from the first motor, the first speed value is negative; a second speed acquiring unit (103) configured to acquire a second speed value of a second motor, the second motor being configured to pull a second end of the hoist of the crane, the second end being the opposite end of the first end in a trolley traveling direction of the crane, wherein, when the second end of the hoist moves toward the second motor, the second speed value is positive, and when the second end of the hoist moves away from the second motor, the second speed value is negative; a first speed difference acquiring unit (105) configured to acquire a first speed difference between the first speed value and the second speed value; a first speed difference threshold acquiring unit (107) configured to acquire a first speed difference threshold; and a first PI controller (109) configured to, if the first speed difference between the first speed value and the second speed value is smaller than the first speed difference threshold, send a control instruction to the first motor to increase a torque output value of the first motor in the trolley traveling direction.

In some embodiments, the device further comprises: a third speed acquiring unit (201) configured to acquire a third speed value of a third motor, the third motor being configured to pull a third end of the hoist of the crane, the third end being the opposite end of the first end in a cart traveling direction of the crane, wherein, when the third end of the hoist moves toward the third motor, the third speed value is positive, and when the third end of the hoist moves away from the third motor, the third speed value is negative; a second speed difference acquiring unit (203) configured to acquire a second speed difference between the first speed value and the third speed value; a second speed difference threshold acquiring unit (205) configured to acquire a second speed difference threshold; and a second PI controller (207) configured to, if the second speed difference between the first speed value and the third speed value is smaller than the second speed difference threshold, send a control instruction to the first motor to increase a torque output value of the first motor in the cart traveling direction.

In some embodiments, the device further comprises a first target value acquiring unit (301) configured to acquire a first speed difference target value, wherein increasing a torque output value of the first motor in the trolley traveling direction comprises increasing a torque output value of the first motor until a first speed difference between the first speed value and the second speed value reaches the first speed difference target value.

In some embodiments, the device further comprises a second target value acquiring unit (303) configured to acquire a second speed difference target value, wherein increasing a torque output value of the first motor in the cart traveling direction comprises increasing a torque output value of the first motor until a second speed difference between the first speed value and the third speed value reaches the second speed difference target value.

In some embodiments, the device further comprises an enable instruction acquiring unit (305) configured to acquire an enable instruction, the enable instruction being used to allow a control instruction to be sent to the first motor to increase a torque output value of the first motor.

In some embodiments, the device further comprises a limit value acquiring unit (307) configured to acquire a torque high limit and a torque low limit, wherein a torque output value of the first motor is limited to not exceed the torque high limit or the torque low limit.

In some embodiments, the device further comprises a regulation parameter acquiring unit (309) configured to acquire a proportional parameter and an integral time, wherein a torque output value of the first motor is regulated on the basis of the proportional parameter and the integral time.

As another example, some embodiments include a system for controlling a crane, the system comprising: a first motor (401) configured to pull a first end of the hoist of a crane; a second motor (403) configured to pull a second end of the hoist of the crane, the second end being the opposite end of the first end in a trolley traveling direction of the crane; and a device (10) for controlling a crane, comprising: a first speed acquiring unit (101) configured to acquire a first speed value of the first motor (401), wherein, when the first end of the hoist moves toward the first motor (401), the first speed value is positive, and when the first end of the hoist moves away from the first motor (401), the first speed value is negative; a second speed acquiring unit (103) configured to acquire a second speed value of the second motor (403), wherein, when the second end of the hoist moves toward the second motor (403), the second speed value is positive, and when the second end of the hoist moves away from the second motor (403), the second speed value is negative; a first speed difference acquiring unit (105) configured to acquire a first speed difference between the first speed value and the second speed value; a first speed difference threshold acquiring unit (107) configured to acquire a first speed difference threshold; and a first PI controller (109) configured to, if the first speed difference between the first speed value and the second speed value is smaller than the first speed difference threshold, send a control instruction to the first motor to increase a torque output value of the first motor (401) in the trolley traveling direction.

In some embodiments, the system further comprises: a third motor (405) configured to pull a third end of the hoist of a crane, the third end being the opposite end of the first end in a cart traveling direction of the crane; and the device (10) further comprises: a third speed acquiring unit (201) configured to acquire a third speed value of the third motor (405), wherein, when the third end of the hoist moves toward the third motor (405), the third speed value is positive, and when the third end of the hoist moves away from the third motor (405), the third speed value is negative; a second speed difference acquiring unit (203) configured to acquire a second speed difference between the first speed value and the third speed value; a second speed difference threshold acquiring unit (205) configured to acquire a second speed difference threshold; and a second PI controller (207) configured to, if the second speed difference between the first speed value and the third speed value is smaller than the second speed difference threshold, send a control instruction to the first motor to increase a torque output value of the first motor (401) in the cart traveling direction.

As another example, some embodiments include a storage medium, characterized by comprising a stored program that, when run, controls a device where the storage medium is located to implement one or more of the methods as described herein.

As another example, some embodiments include a computer program product, characterized by being tangibly stored on a computer-readable medium and comprising a computer-executable instruction that, when executed, causes at least one processor to implement one or more of the methods as described herein.

BRIEF DESCRIPTION OF THE DRAWINGS

The drawings explained herein are intended to provide a further understanding of the present application and constitute part of the present application. Exemplary embodiments of the present application and descriptions thereof are intended to explain the present application, instead of improperly limiting the scope pf the teachings of the present application. Among the drawings.

DETAILED DESCRIPTION

Figure 1:
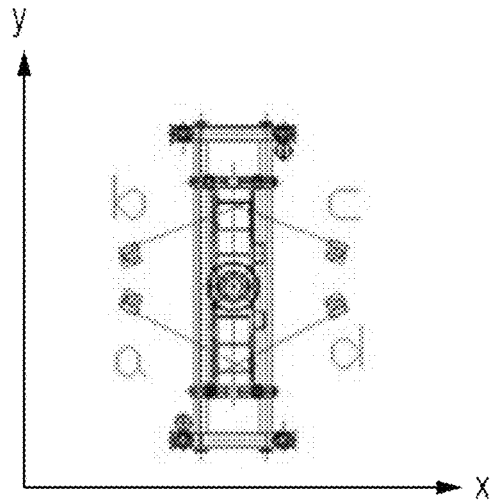
FIG. 1 is a schematic diagram for a hoist anti-sway system according to the prior art.

Various embodiments of the teachings herein include a method for controlling a crane comprising: acquiring a first speed value of a first motor, the first motor being configured to pull a first end of the hoist of a crane, wherein, when the first end of the hoist moves toward the first motor, the first speed value is positive, and when the first end of the hoist moves away from the first motor, the first speed value is negative; acquiring a second speed value of a second motor, the second motor being configured to pull a second end of the hoist of the crane, the second end being the opposite end of the first end in a trolley traveling direction of the crane, wherein, when the second end of the hoist moves toward the second motor, the second speed value is positive, and when the second end of the hoist moves away from the second motor, the second speed value is negative; acquiring a first speed difference between the first speed value and the second speed value; acquiring a first speed difference threshold; and, if the first speed difference between the first speed value and the second speed value is smaller than the first speed difference threshold, sending a control instruction to the first motor to increase a torque output value of the first motor in the trolley traveling direction. Thus, when the hoist sways away from the first motor in the trolley traveling direction, the first motor on the opposite side of the hoist sway increases the torque output, thereby controlling the amplitude of sway of the hoist in the trolley traveling direction.

In some embodiments, the method further comprises: acquiring a third speed value of a third motor, the third motor being configured to pull a third end of the hoist of the crane, the third end being the opposite end of the first end in a cart traveling direction of the crane, wherein, when the third end of the hoist moves toward the third motor, the third speed value is positive, and when the third end of the hoist moves away from the third motor, the third speed value is negative; acquiring a second speed difference between the first speed value and the third speed value; acquiring a second speed difference threshold; and, if the second speed difference between the first speed value and the third speed value is smaller than the second speed difference threshold, sending a control instruction to the first motor to increase a torque output value of the first motor in the cart traveling direction. Thus, when the hoist sways away from the first motor in the traveling direction of the crane, the first motor on the opposite side of the hoist sway increases the torque output, thereby controlling the amplitude of sway of the hoist in the cart traveling direction.

In some embodiments, the method further comprises: acquiring a first speed difference target value, wherein increasing a torque output value of the first motor in the trolley traveling direction comprises increasing a torque output value of the first motor until a first speed difference between the first speed value and the second speed value reaches the first speed difference target value. Thus, an amplitude of sway of the hoist in the trolley traveling direction is kept within a desired range.

In some embodiments, the method further comprises acquiring a second speed difference target value, wherein increasing a torque output value of the first motor in the cart traveling direction comprises increasing a torque output value of the first motor until a second speed difference between the first speed value and the third speed value reaches the second speed difference target value. Thus, an amplitude of sway of the hoist in the cart traveling direction is kept within a desired range.

In some embodiments, the method further comprises acquiring an enable instruction, the enable instruction being used to allow a control instruction to be sent to the first motor to increase a torque output value of the first motor.

Thus, it is possible to allow the control of an amplitude of sway of a hoist when an amplitude of sway of the hoist needs to be controlled.

In some embodiments, the method further comprises acquiring a torque high limit and a torque low limit, wherein a torque output value of the first motor is limited to not exceed the torque high limit or the torque low limit. Thus, torque output by a motor is limited to a required range.

In some embodiments, the method further comprises acquiring a proportional parameter and an integral time, wherein a torque output value of the first motor is regulated on the basis of a proportional parameter and an integral time. Thus, a torque output value of a motor is automatically regulatable as the state of the system changes.

In some embodiments, the method further comprises if a first speed difference between the first speed value and the second speed value is greater than zero, sending a control instruction to the first motor to reduce a torque output value of the first motor in the trolley traveling direction. Thus, when the hoist sways toward the first motor in the trolley traveling direction, the torque of the first motor is reduced, but the torque of the first motor is kept within a suitable range of torque.

In some embodiments, the method further comprises: if a second speed difference between the first speed value and the third speed value is greater than zero, sending a control instruction to the first motor to reduce a torque output value of the first motor in the cart traveling direction. Thus, when the hoist sways toward the first motor in the cart traveling direction, the torque of the first motor is reduced, but the torque of the first motor is kept within a suitable range of torque.

As another example, some embodiments include a device for controlling a crane, comprising: a first speed acquiring unit configured to acquire a first speed value of a first motor, the first motor being configured to pull a first end of the hoist of a crane, wherein, when the first end of the hoist moves toward the first motor, the first speed value is positive, and when the first end of the hoist moves away from the first motor, the first speed value is negative; a second speed acquiring unit configured to acquire a second speed value of a second motor, the second motor being configured to pull a second end of the hoist of a crane, the second end being the opposite end of the first end in a trolley traveling direction of the crane, wherein, when the second end of the hoist moves toward the second motor, the second speed value is positive, and when the second end of the hoist moves away from the second motor, the second speed value is negative; a first speed difference acquiring unit configured to acquire a first speed difference between the first speed value and the second speed value; a first speed difference threshold acquiring unit configured to acquire a first speed difference threshold; and a first PI controller configured to, if the first speed difference between the first speed value and the second speed value is smaller than the first speed difference threshold, send a control instruction to the first motor to increase a torque output value of the first motor in the trolley traveling direction. Thus, when the hoist sways in a trolley traveling direction, the motor on the opposite side of the hoist sway increases the torque output, thereby controlling an amplitude of sway of the hoist in the trolley traveling direction.

In some embodiments, the device further comprises: a third speed acquiring unit configured to acquire a third speed value of a third motor, the third motor being configured to pull a third end of the hoist of a crane, the third end being the opposite end of the first end in a cart traveling direction of the crane, wherein, when the third end of the hoist moves toward the third motor, the third speed value is positive, and when the third end of the hoist moves away from the third motor, the third speed value is negative; a second speed difference acquiring unit configured to acquire a second speed difference between the first speed value and the third speed value; a second speed difference threshold acquiring unit configured to acquire a second speed difference threshold; and a second PI controller configured to, if the second speed difference between the first speed value and the third speed value is smaller than the second speed difference threshold, send a control instruction to the first motor to increase a torque output value of the first motor in the cart traveling direction. Thus, when the hoist sways in a cart traveling direction, the motor on the opposite side of the hoist sway increases the torque output, thereby controlling an amplitude of sway of the hoist in the cart traveling direction.

In some embodiments, the device further comprises a first target value acquiring unit configured to acquire a first speed difference target value, wherein increasing a torque output value of the first motor in the trolley traveling direction comprises increasing a torque output value of the first motor until a first speed difference between the first speed value and the second speed value reaches the first speed difference target value. Thus, an amplitude of sway of the hoist in the trolley traveling direction is kept within a desired range.

In some embodiments, the device further comprises a second target value acquiring unit configured to acquire a second speed difference target value, wherein increasing a torque output value of the first motor in the cart traveling direction comprises increasing a torque output value of the first motor until a second speed difference between the first speed value and the third speed value reaches the second speed difference target value. Thus, an amplitude of sway of the hoist in the cart traveling direction is kept within a desired range.

In some embodiments, the device further comprises an enable instruction acquiring unit configured to acquire an enable instruction, the enable instruction being used to allow a control instruction to be sent to the first motor to increase a torque output value of the first motor. Thus, it is possible to allow the control of an amplitude of sway of a hoist when an amplitude of sway of the hoist needs to be controlled.

In some embodiments, the device further comprises a limit value acquiring unit configured to acquire a torque high limit and a torque low limit, wherein a torque output value of the first motor is limited to not exceed the torque high limit or the torque low limit. Thus, torque output by a motor is limited to a required range.

In some embodiments, the device further comprises a regulation parameter acquiring unit configured to acquire a proportional parameter and an integral time, wherein a torque output value of the first motor is regulated on the basis of a proportional parameter and an integral time. Thus, a torque output value of a motor is automatically regulatable as the state of the system changes.

As another example, some embodiments include a system for controlling a crane comprising: a first motor configured to pull a first end of the hoist of a crane; a second motor configured to pull a second end of the hoist of the crane, the second end being the opposite end of the first end in a trolley traveling direction of the crane; a device for controlling a crane, comprising: a first speed acquiring unit configured to acquire a first speed value of a first motor, wherein, when the first end of the hoist moves toward the first motor, the first speed value is positive, and when the first end of the hoist moves away from the first motor, the first speed value is negative; a second speed acquiring unit configured to acquire a second speed value of a second motor, wherein, when the second end of the hoist moves toward the second motor, the second speed value is positive, and when the second end of the hoist moves away from the second motor, the second speed value is negative; a first speed difference acquiring unit configured to acquire a first speed difference between the first speed value and the second speed value; a first speed difference threshold acquiring unit configured to acquire a first speed difference threshold; and a first PI controller configured to, if the first speed difference between the first speed value and the second speed value is smaller than the first speed difference threshold, send a control instruction to the first motor to increase a torque output value of the first motor in the trolley traveling direction. Thus, when the hoist sways in a trolley traveling direction, the motor on the opposite side of the hoist sway increases the torque output, thereby controlling an amplitude of sway of the hoist in the trolley traveling direction. In some embodiments, the system further comprises: a third motor configured to pull a third end of the hoist of a crane, the third end being the opposite end of the first end in a cart traveling direction of the crane; the device further comprises: a third speed acquiring unit configured to acquire a third speed value of a third motor, wherein, when the third end of the hoist moves toward the third motor, the third speed value is positive, and when the third end of the hoist moves away from the third motor, the third speed value is negative; a second speed difference acquiring unit configured to acquire a second speed difference between the first speed value and the third speed value; a second speed difference threshold acquiring unit configured to acquire a second speed difference threshold; and a second PI controller configured to, if the second speed difference between the first speed value and the third speed value is smaller than the second speed difference threshold, send a control instruction to the first motor to increase a torque output value of the first motor in the cart traveling direction. Thus, when the hoist sways in a cart traveling direction, the motor on the opposite side of the hoist sway increases the torque output, thereby controlling an amplitude of sway of the hoist in the cart traveling direction.

As another example, some embodiments include a storage medium comprising a stored program that when run, controls a device where the storage medium is located to implement one or more of the methods described in the present application.

As another example, some embodiments include a processor configured to run a program that, when executed, implements one or more of the methods described in the present application.

As another example, some embodiments include a terminal comprising: one or more processors, a memory, and one or more programs, wherein said one or more programs are stored in the memory and configured to be executed by said one or more processors, said one or more programs comprising instructions for implementing one or more of the methods described in the present application.

As another example, some embodiments include a computer program product tangibly stored on a computer-readable medium and comprising a computer-executable instruction that, when executed, causes at least one processor to implement one or more of the methods described in the present application. Thus, when the hoist sways, the motor on the opposite side of the hoist sway increases the torque output, thereby controlling an amplitude of sway of the hoist.

In some embodiments, a speed difference between a pair of anti-sway motors in a sway direction of the hoist is acquired, and the output torque of the motor on the opposite side in the sway direction is controlled on the basis of the speed difference; this at least solves the technical problem that it is difficult to control the swaying of the hoist of a crane during operation, improving the effect of preventing the hoist from swaying, and making it easy to configure an anti-sway system In order for those of ordinary skill in the art to better understand the present application, the technical solution provided in example embodiments of the present application will be described clearly and completely with reference to the drawings for embodiments of the present application. Obviously, the described embodiments are only some, but not all, embodiments of the present application. Any embodiments obtained by those of ordinary skill in the art based on the described embodiments of the present application fall into the protection scope of the present application.

Note that terms such as “first” and “second” used in the specification and claims of the present application and the above-mentioned drawings are intended to differentiate between similar targets, instead of describing a specific sequence or a precedence relationship. It should be understood that terms used in this way are interchangeable where appropriate, so that embodiments of the present application described herein may be implemented in a sequence other than any of those shown or described herein. Further, terms “comprising”, “provided with”, and any variants thereof are intended to cover nonexclusive inclusion. For example, a process, method, system, product, or device comprising a series of steps or modules or units are not necessarily limited to explicitly listed steps or modules or units, and instead may include other steps or modules or units that are not explicitly listed or are intrinsic to these processes, methods, systems, products, or devices.

Figure 2:
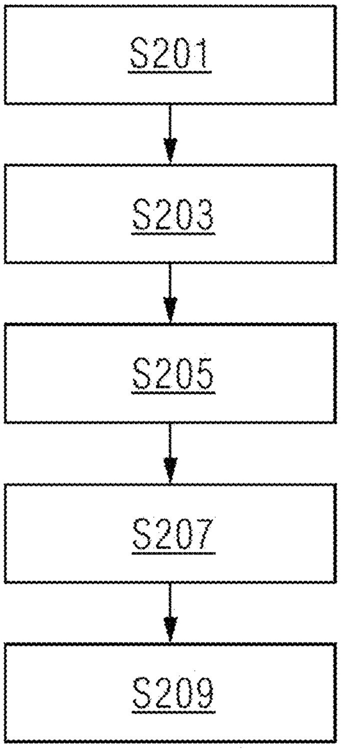
FIG. 2 is a flowchart for a method for controlling a crane incorporating teachings of the present application.

FIG. 2 is a flowchart for a method for controlling a crane incorporating teachings of the present application. As shown in FIG. 2, the method comprises: step S201 of acquiring a first speed value of a first motor, the first motor being configured to pull a first end of the hoist of a crane, wherein, when the first end of the hoist moves toward the first motor, the first speed value is positive, and when the first end of the hoist moves away from the first motor, the first speed value is negative; step S203 of acquiring a second speed value of a second motor, the second motor being configured to pull a second end of the hoist of the crane, the second end being the opposite end of the first end in a trolley traveling direction of the crane, wherein, when the second end of the hoist moves toward the second motor, the second speed value is positive, and when the second end of the hoist moves away from the second motor, the second speed value is negative; step S205 of acquiring a first speed difference between the first speed value and the second speed value; step S207 of acquiring a first speed difference threshold; and step S209 of, if the first speed difference between the first speed value and the second speed value is smaller than the first speed difference threshold, sending a control instruction to the first motor to increase a torque output value of the first motor in the trolley traveling direction. It should be understood that the execution of step S205 of acquiring a first speed difference and of step S207 of acquiring a first speed difference threshold is not subject to a sequence, as long as a first speed difference and a first speed difference threshold are obtainable.

Figure 3:
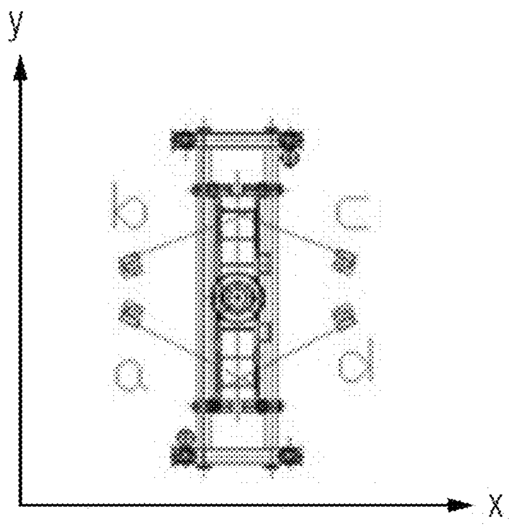
FIG. 3 is a schematic diagram for a method for controlling a crane incorporating teachings of the present application.

FIG. 3 is a schematic diagram for a method for controlling a crane incorporating teachings of the present application. As shown in FIG. 3, a trolley of the crane is traveling along the x-axis, and the four corners of the hoist are respectively pulled by anti-sway motors a, b, c, and d. When the hoist is stationary, the speed of the four anti-sway motors is zero. When the hoist moves up and down, the four anti-sway motors follow the hoist at basically the same speed. In an embodiment according to the present application, a speed difference between two motors positioned facing each other is used as a controlled quantity of sway, and the control quantity is a given speed (target speed difference) 0 (in other words, the speed difference between the two motors is 0); when the hoist is stationary, the actual speed of a motor is basically equal to the given speed. A speed difference between two motors positioned facing each other can accurately reflect the sway direction and sway strength of the hoist.

When the hoist is swaying in the trolley traveling direction (for example, when the trolley is traveling or the hoist is swaying for another reason), that is, along the x-axis, assume that the hoist is swaying in the positive direction of the x-axis, the anti-sway motor a is the first motor, and the anti-sway motor d on the opposite side of the x-axis direction is the second motor. For example, a first speed value of the first motor and a second speed value of the second motor are acquired by a sensor; when the first end of the hoist moves toward the first motor, the first speed value is positive; when the first end of the hoist moves away from the first motor, the first speed value is negative; when the second end of the hoist moves towards the second motor, the second speed value is positive; and when the second end of the hoist moves away from the second motor, the second speed value is negative. In this exemplary scenario, a first speed difference between the first speed value and the second speed value is negative. The first speed difference may be compared with a preset first speed difference threshold; if the first speed difference is smaller than the first speed difference threshold, then a torque output value of the first motor (anti-sway motor a) in the x-axis direction is increased. Thus, the first motor (anti-sway motor a) tightly stretches the first end of the hoist in the x-axis direction, thereby reducing the amplitude of sway of the hoist in the positive direction of the x-axis. Setting a first speed difference threshold allows the avoidance of the necessity to start the anti-sway process when the amplitude of sway is very low.

Taking, as an example, the sway of the hoist in the negative direction of the x-axis, the anti-sway motor c is the first motor, and the anti-sway motor b on the opposite side is the second motor; based on the same principle as described in the preceding example, if the first speed difference is smaller than the first speed difference threshold, then the torque output value of the first motor (anti-sway motor c) in the x-axis direction is increased. Thus, the first motor (anti-sway motor c) tightly stretches the first end of the hoist in the x-axis direction, thereby reducing the amplitude of sway of the hoist in the negative direction of the x-axis.

Methods incorporating teachings of the present application may be applied to the anti-sway motors a, b, c, and d at the four corners of the hoist, respectively, so as to restrict the sway of the hoist in the trolley traveling direction. Thus, when the hoist sways in the trolley traveling direction, the motor on the opposite side of the hoist sway increases the torque output, thereby controlling the amplitude of sway of the hoist in the trolley traveling direction.

Figure 4:
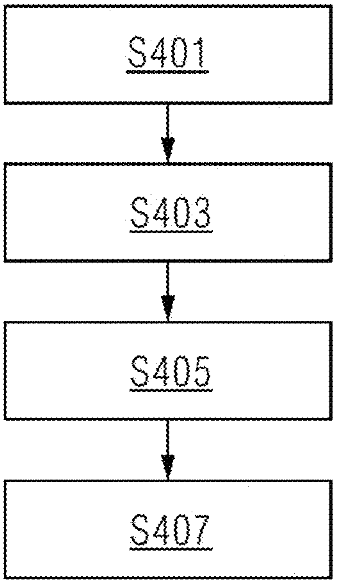
FIG. 4 is a flowchart for a method for controlling a crane incorporating teachings of the present application.

FIG. 4 is a flowchart for a method for controlling a crane illustrating an exemplary embodiment of the present application. The example method further comprises: step S401 of acquiring a third speed value of a third motor, the third motor being configured to pull a third end of the hoist of a crane, the third end being the opposite end of the first end in a cart traveling direction of the crane, wherein, when the third end of the hoist moves towards the third motor, the third speed value is positive, and when the third end of the hoist moves away from the third motor, the third speed value is negative; step S403 of acquiring a second speed difference between the first speed value and the third speed value; step S405 of acquiring a second speed difference threshold; and step S407 of, if the second speed difference between the first speed value and the third speed value is smaller than the second speed difference threshold, sending a control instruction to the first motor to increase a torque output value of the first motor in the cart traveling direction. It should be understood that the execution of step S403 of acquiring a second speed difference and of step S405 of acquiring a second speed difference threshold is not subject to a sequence, as long as a second speed difference and a second speed difference threshold are obtainable.

Figure 5:
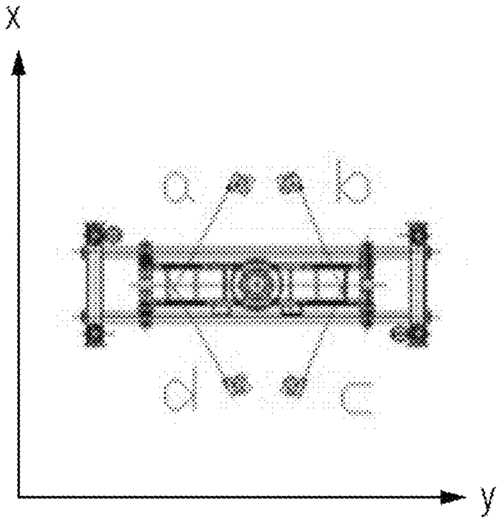
FIG. 5 is a schematic diagram for a method for controlling a crane incorporating teachings of the present application.

FIG. 5 is a schematic diagram for a method for controlling a crane incorporating teachings of the present application. As shown in FIG. 5, a cart of the crane is traveling along the y-axis, and the four corners of the hoist are respectively pulled by the anti-sway motors a, b, c, and d. When the hoist is swaying in the cart traveling direction (for example, when the cart is traveling or the hoist is swaying for another reason), that is, along the y-axis, assume that the hoist sways along the positive direction of the y-axis, the anti-sway motor a is the first motor, and the anti-sway motor b on the opposite side in the y-axis direction is the third motor. For example, a third speed value of the third motor is further acquired by a sensor; when the first end of the hoist moves toward the first motor, the first speed value is positive; when the first end of the hoist moves away from the first motor, the first speed value is negative; when the third end of the hoist moves towards the third motor, the third speed value is positive; and when the third end of the hoist moves away from the third motor, the third speed value is negative. In this exemplary scenario, a second speed difference between the first speed value and the third speed value is negative. The second speed difference may be compared with a preset second speed difference threshold; if the second speed difference is smaller than the second speed difference threshold, then the torque output value of the first motor (anti-sway motor a) in the y-axis direction is increased. Thus, the first motor (anti-sway motor a) tightly stretches the first end of the hoist in the y-axis direction, thereby reducing the amplitude of sway of the hoist in the positive direction of the y-axis. Setting a second speed difference threshold allows the avoidance of the necessity to start the anti-sway process when the amplitude of sway is very low.

Taking, as an example, the sway of the hoist in the negative direction of the y-axis, the anti-sway motor c is the first motor, and the anti-sway motor d on the opposite side is the third motor; based on the same principle as described in the preceding example, if the second speed difference is smaller than the second speed difference threshold, then the torque output value of the first motor (anti-sway motor c) in the y-axis direction is increased. Thus, the first motor (anti-sway motor c) tightly stretches the first end of the hoist in the y-axis direction, thereby reducing the amplitude of sway of the hoist in the negative direction of the y-axis.

The methods taught herein may be applied to the anti-sway motors a, b, c, and d at the four corners of the hoist, respectively, so as to restrict the sway of the hoist in the cart traveling direction. Thus, when the hoist sways in the cart traveling direction, the motor on the opposite side of the hoist sway increases the torque output, thereby controlling the amplitude of sway of the hoist in the cart traveling direction.

Figure 6:
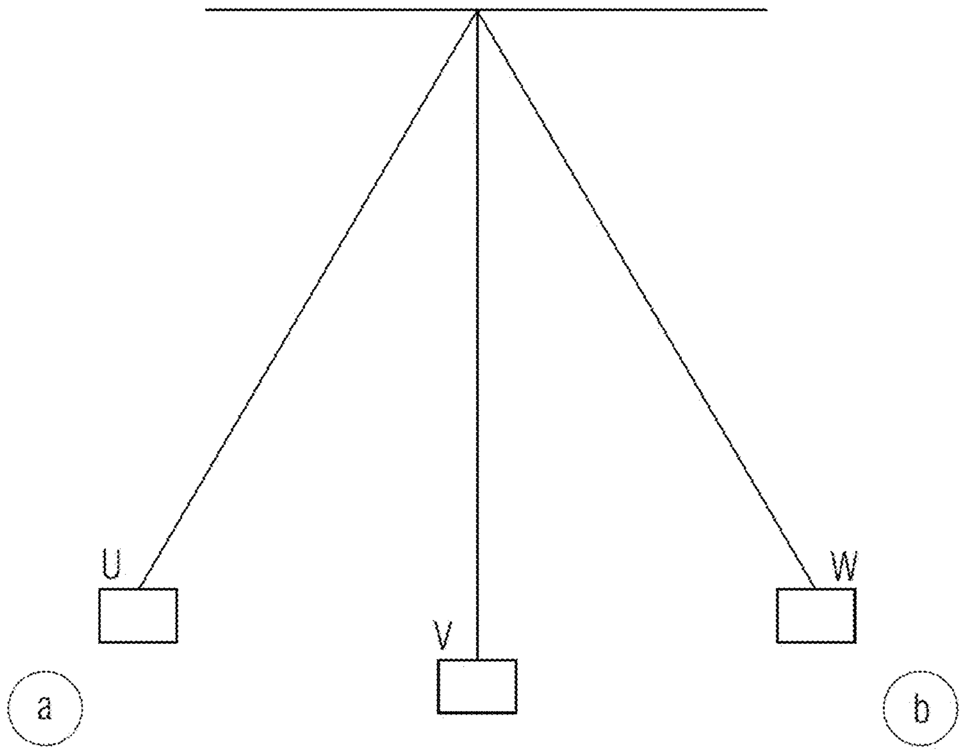
FIG. 6 is a schematic diagram for a hoist swaying incorporating teachings of the present application.

FIG. 6 is a schematic diagram for a hoist sway incorporating teachings of the present application. As shown in FIG. 6, when stationary, the hoist is in position V. When swaying in the trolley traveling direction or the cart traveling direction, the hoist, for example, is in position U or position W. Taking, as an example, the anti-sway motors a and b located on the opposite sides in the sway direction, when the hoist sways to position U, that is, in the direction of the anti-sway motor a, the speed value of the anti-sway motor a is positive, the speed value of the anti-sway motor b is negative, the speed difference between the speed value of the anti-sway motor b and the speed value of the anti-sway motor a is negative, and the anti-sway motor b functions as the "first motor"; when the speed difference is smaller than a speed difference threshold, a PI controller is enabled to increase the torque output value of the anti-sway motor b, so that the anti-sway motor b tightly stretches the hoist to prevent the hoist from swaying in the direction of the anti-sway motor a. Conversely, if the hoist sways to position W, that is, in the direction of the anti-sway motor b, then the anti-sway motor a functions as the "first motor", and the speed difference between the speed of the anti-sway motor a and the speed of the anti-sway motor b is negative; when the speed difference is smaller than a speed difference threshold, the PI controller is enabled to increase the torque output value of the anti-sway motor a, so that the anti-sway motor a tightly stretches the hoist to prevent the hoist from swaying in the direction of the anti-sway motor b.

In some embodiments, the method further comprises acquiring a first speed difference target value, wherein increasing a torque output value of the first motor in the trolley traveling direction comprises increasing a torque output value of the first motor until a first speed difference between the first speed value and the second speed value reaches the first speed difference target value.

In some embodiments, the method further comprises acquiring a second speed difference target value, wherein increasing a torque output value of the first motor in the cart traveling direction comprises increasing a torque output value of the first motor until a second speed difference between the first speed value and the third speed value reaches the second speed difference target value.

In some embodiments, the method further comprises acquiring a torque high limit and a torque low limit, wherein a torque output value of the first motor is limited to not exceed the torque high limit or the torque low limit.

In some embodiments, the process of regulating the torque of a motor is implemented by using a PI controller. For example, the PI controller implements a control method that allows a speed difference between a controlled motor and a motor positioned facing the sway direction of the controlled motor to reach a speed difference target value. When there is a deviation between a given value (speed difference target value) and a feedback value (actual speed difference), it will automatically regulate the output value, and when there is no deviation, it will keep the original output value. Therefore, the method allows automatic regulation of the torque output value on the basis of the speed difference value until the speed difference reaches the speed difference target value; for example, when the speed difference target value is 0, or when a torque limit is reached, the hoist is pulled backward with the maximum torque. When the hoist is traveling or when the trolley or cart is traveling, the four anti-sway motors are all assigned appropriate torque values to ensure that the steel wire rope remains tightly stretched and can passively follow the hoist; even when the hoist is swaying, the steel wire rope may be automatically shrunk by a PI controller to limit the sway of the hoist. Thus, torque output by a motor is limited within a required range, and the amplitude of sway of the hoist in the trolley traveling direction and the amplitude of sway of the hoist in the cart traveling direction are kept within a desired range.

In some embodiments, the method further comprises acquiring an enable instruction, the enable instruction being used to allow a control instruction to be sent to the first motor to increase a torque output value of the first motor. In addition to enabling the PI controller to start the anti-sway process when the speed difference is smaller than a speed difference threshold, it is also possible to enable the PI controller to start the anti-sway process according to, for example, a manually input instruction, thereby enabling the restriction of the sway of the hoist when needed.

In some embodiments, a method further comprises acquiring a proportional parameter and an integral time, wherein a torque output value of the first motor is regulated on the basis of a proportional parameter and an integral time. In some embodiments, the PI controller, on the basis of a proportional parameter and an integral time, automatically regulates a torque output value of a motor as the system state changes.

In some embodiments, the method further comprises if a first speed difference between the first speed value and the second speed value is greater than zero, sending a control instruction to the first motor to reduce a torque output value of the first motor in the trolley traveling direction. In this case, the hoist sways toward the first motor in the trolley traveling direction; for example, the hoist may be on the same side or the opposite side of the first motor, and the torque of the first motor is reduced but is kept greater than the torque lower limit, thereby keeping the hoist tightly stretched.

In some embodiments, the method further comprises if a second speed difference between the first speed value and the third speed value is greater than zero, sending a control instruction to the first motor to reduce a torque output value of the first motor in the cart traveling direction. In this case, the hoist sways toward the first motor in the cart traveling direction; for example, the hoist may be on the same side or the opposite side of the first motor, and the torque of the first motor is reduced but is kept greater than the torque lower limit, thereby keeping the hoist tightly stretched. Thus, when the hoist sways toward the first motor in the trolley traveling direction or in the cart traveling direction, the torque of the first motor is reduced but is kept within a proper range of torque. Since a method according to an exemplary embodiment of the present application is applied to all the four motors that pull the four corners of the hoist, in this case, the torque of the motor on the opposite side of the first motor in the trolley or cart traveling direction is increased, so that the amplitude of sway of the hoist to the zero position is controlled.

Figure 7:
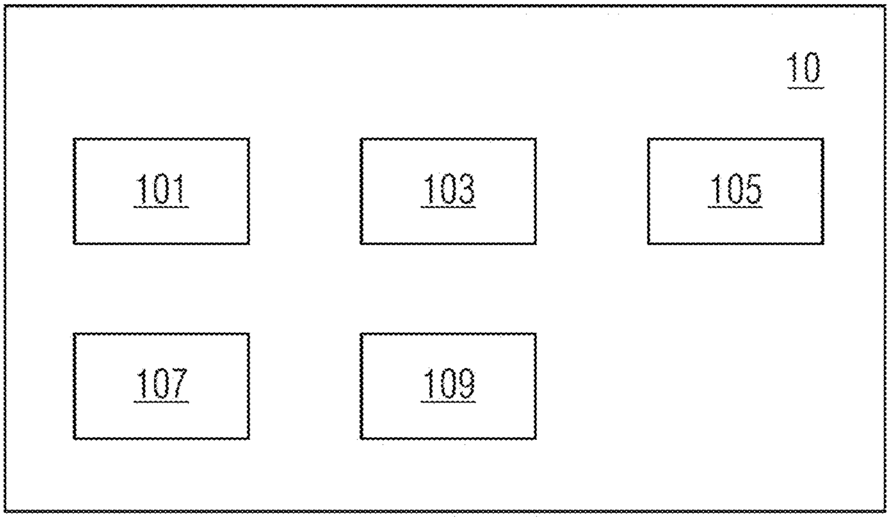
FIG. 7 is a block diagram for a device for controlling a crane incorporating teachings of the present application.

FIG. 7 is a block diagram for a device for controlling a crane incorporating teachings of the present application. As shown in FIG. 7, the device 10 for controlling a crane according to an embodiment of the present application comprises: a first speed acquiring unit 101, a second speed acquiring unit 103, a first speed difference acquiring unit 105, a first speed difference threshold acquiring unit 107, and a first PI controller 109.

The first speed acquiring unit 101 is configured to acquire a first speed value of a first motor, the first motor being configured to pull a first end of the hoist of a crane, wherein, when the first end of the hoist moves toward the first motor, the first speed value is positive; and when the first end of the hoist moves away from the first motor, the first speed value is negative. The second speed acquiring unit 103 is configured to acquire a second speed value of a second motor, the second motor being configured to pull a second end of the hoist of the crane, the second end being the opposite end of the first end in a trolley traveling direction of the crane, wherein, when the second end of the hoist moves towards the second motor, the second speed value is positive; and when the second end of the hoist moves away from the second motor, the second speed value is negative. The first speed difference acquiring unit 105 is configured to acquire a first speed difference between the first speed value and the second speed value. The first speed difference threshold acquiring unit 107 is configured to acquire a first speed difference threshold. The first PI controller 109 is configured to, if the first speed difference between the first speed value and the second speed value is smaller than the first speed difference threshold, send a control instruction to the first motor to increase a torque output value of the first motor in the trolley traveling direction. Thus, when the hoist sways in a trolley traveling direction, the motor on the opposite side of the hoist sway increases the torque output, thereby controlling an amplitude of sway of the hoist in the trolley traveling direction.

Figure 8:
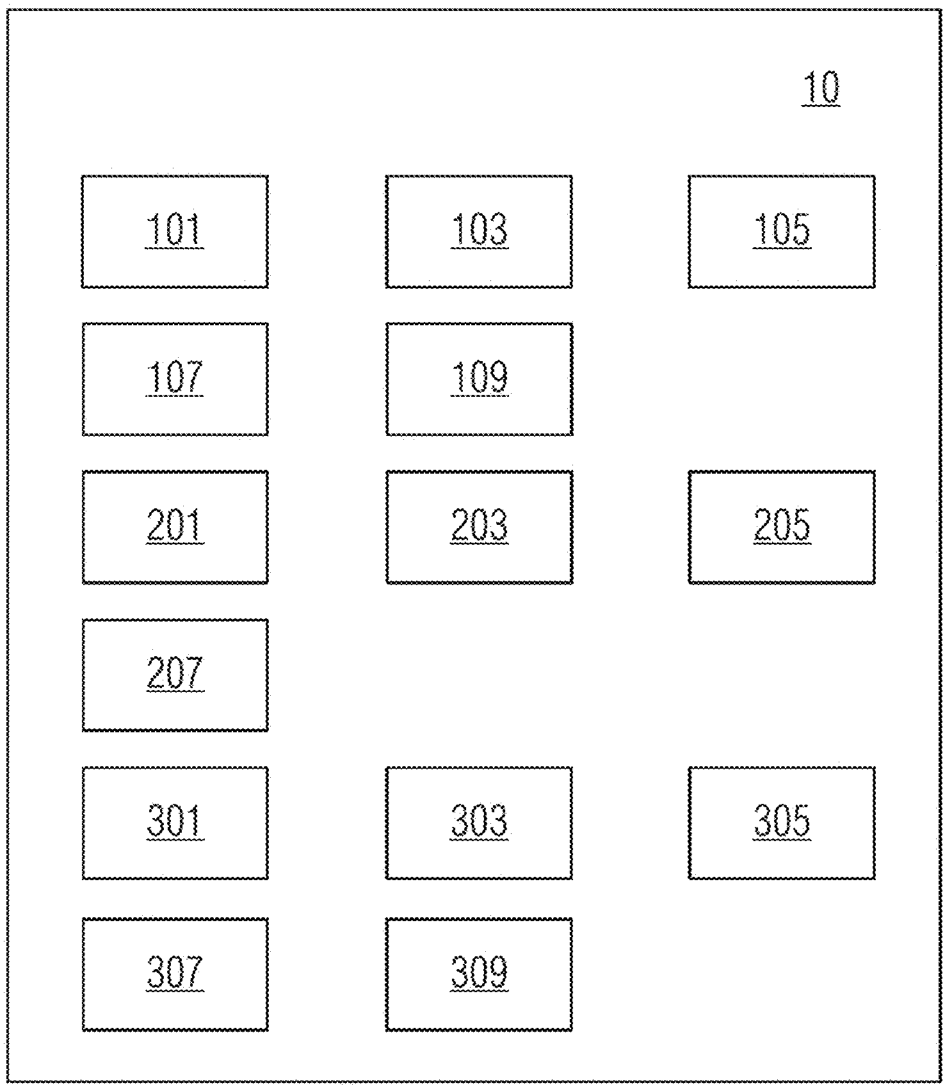
FIG. 8 is a block diagram for a device for controlling a crane incorporating teachings of the present application.

FIG. 8 is a block diagram for a device for controlling a crane incorporating teachings of the present application. As shown in FIG. 8, a device for controlling a crane according to an exemplary embodiment of the present application further comprises: a third speed acquiring unit 201, a second speed difference acquiring unit 203, a second speed difference threshold acquiring unit 205, and a second PI controller 207.

The third speed acquiring unit 201 is configured to acquire a third speed value of a third motor, the third motor being configured to pull a third end of the hoist of a crane, the third end being the opposite end of the first end in a cart traveling direction of the crane, wherein, when the third end of the hoist moves towards the third motor, the third speed value is positive, and when the third end of the hoist moves away from the third motor, the third speed value is negative. The second speed difference acquiring unit 203 is configured to acquire a second speed difference between the first speed value and the third speed value. The second speed difference threshold acquiring unit 205 is configured to acquire a second speed difference threshold. The second PI controller 207 is configured to, if the second speed difference between the first speed value and the third speed value is smaller than the second speed difference threshold, send a control instruction to the first motor to increase a torque output value of the first motor in the cart traveling direction. Thus, when the hoist sways in the cart traveling direction, the motor on the opposite side of the hoist sway increases the torque output, thereby controlling the amplitude of sway of the hoist in the cart traveling direction.

As shown in FIG. 8, the device further comprises a first target value acquiring unit 301 configured to acquire a first speed difference target value, wherein increasing a torque output value of the first motor in the trolley traveling direction comprises increasing a torque output value of the first motor until a first speed difference between the first speed value and the second speed value reaches the first speed difference target value. Thus, an amplitude of sway of the hoist in the trolley traveling direction is kept within a desired range.

As shown in FIG. 8, the device further comprises a second target value acquiring unit 303 configured to acquire a second speed difference target value, wherein increasing a torque output value of the first motor in the cart traveling direction comprises increasing a torque output value of the first motor until a second speed difference between the first speed value and the third speed value reaches the second speed difference target value. Thus, an amplitude of sway of the hoist in the cart traveling direction is kept within a desired range.

As shown in FIG. 8, the device further comprises an enable instruction acquiring unit 305 configured to acquire an enable instruction, the enable instruction being used to allow a control instruction to be sent to the first motor to increase a torque output value of the first motor. Thus, it is possible to allow the control of an amplitude of sway of a hoist when an amplitude of sway of the hoist needs to be controlled.

As shown in FIG. 8, the device further comprises a limit value acquiring unit 307 configured to acquire a torque high limit and a torque low limit, wherein a torque output value of the first motor is limited to not exceed the torque high limit or the torque low limit. Thus, torque output by a motor is limited to a required range.

As shown in FIG. 8, the device further comprises a regulation parameter acquiring unit 309 configured to acquire a proportional parameter and an integral time, wherein a torque output value of the first motor is regulated on the basis of a proportional parameter and an integral time. Thus, a torque output value of a motor is automatically regulatable as the state of the system changes.

In some embodiments, a device for controlling a crane according to an embodiment of the present application implements a method for controlling a crane as described above, and no similar descriptions will be given again herein.

Figure 9:
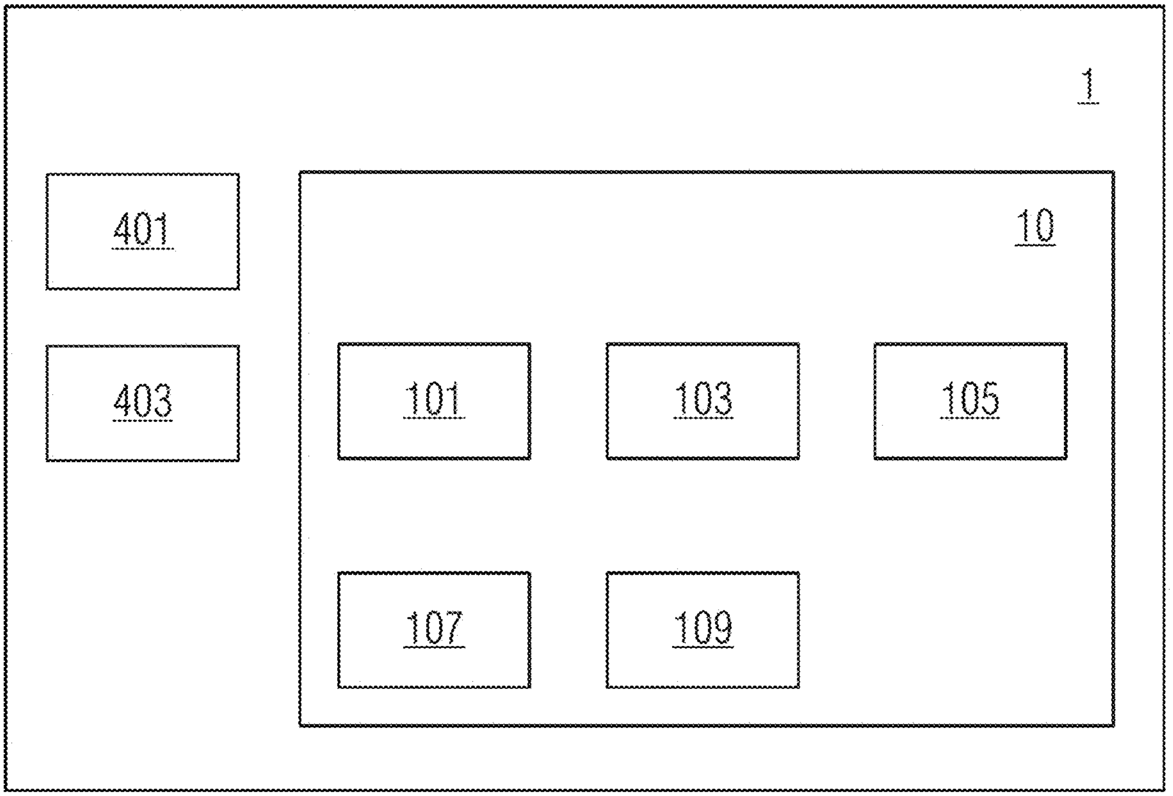
FIG. 9 is a block diagram for a system for controlling a crane incorporating teachings of the present application.

FIG. 9 is a block diagram for a system for controlling a crane incorporating teachings of the present application. As shown in FIG. 9, the system 1 for controlling a crane comprises: a first motor 401, a second motor 403, and a device 10 for controlling a crane.

The first motor 401 is configured to pull a first end of the hoist of the crane. The second motor 403 is configured to pull a second end of the hoist of the crane, the second end being the opposite end of the first end in a trolley traveling direction of the crane. The first speed acquiring unit 101 of the device 10 for controlling a crane is configured to acquire a first speed value of the first motor 401, wherein, when the first end of the hoist moves toward the first motor 401, the first speed value is positive; and when the first end of the hoist moves away from the first motor 401, the first speed value is negative. The second speed acquiring unit 103 of the device 10 for controlling a crane is configured to acquire a second speed value of the second motor 403, wherein, when the second end of the hoist moves towards the second motor 403, the second speed value is positive; and when the second end of the hoist moves away from the second motor 403, the second speed value is negative. The first speed difference acquiring unit 105 of the device 10 for controlling a crane is configured to acquire a first speed difference between the first speed value and the second speed value. The first speed difference threshold acquiring unit 107 of the device 10 for controlling a crane is configured to acquire a first speed difference threshold. The first PI controller 109 of the device 10 for controlling a crane is configured to, if the first speed difference between the first speed value and the second speed value is smaller than the first speed difference threshold, send a control instruction to the first motor 401 to increase a torque output value of the first motor 401 in the trolley traveling direction.

The first motor 401 may be any one of the four anti-sway motors that pull the four ends of the hoist. When the hoist sways in a certain direction, the motor on the opposite side of the sway direction is the "first motor" according to an embodiment of the present application. Thus, when the hoist sways in a trolley traveling direction, the motor on the opposite side of the hoist sway increases the torque output, thereby controlling an amplitude of sway of the hoist in the trolley traveling direction.

Figure 10:
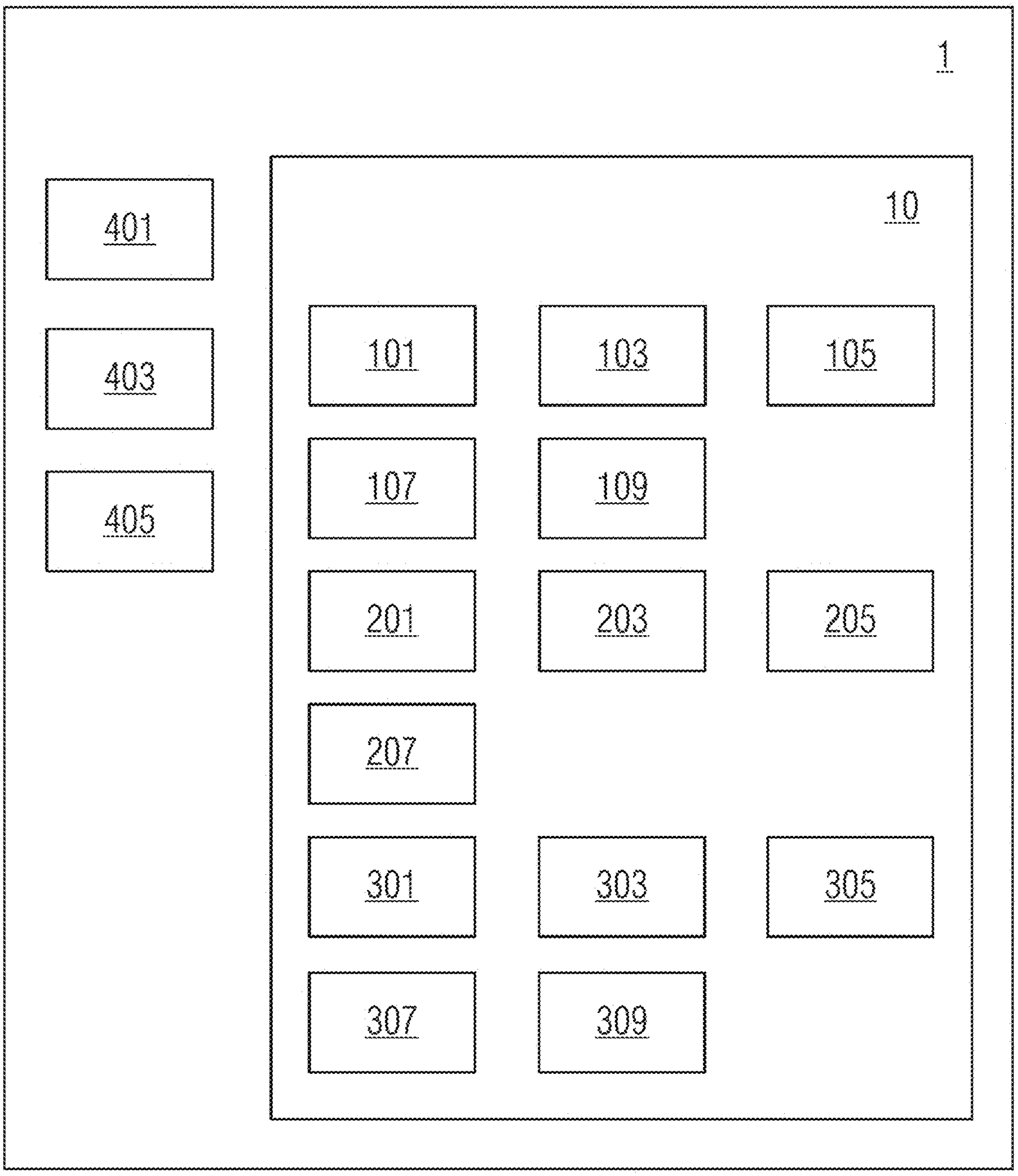
FIG. 10 is a block diagram for a system for controlling a crane incorporating teachings of the present application.

FIG. 10 is a block diagram for a system for controlling a crane incorporating teachings of the present application. As shown in FIG. 10, the system 1 for controlling a crane comprises: a third motor 405 and a device 10 for controlling a crane. The third motor 405 is configured to pull a third end of the hoist of a crane, the third end being the opposite end of the first end in a cart traveling direction of the crane. The third speed acquiring unit 201 of the device 10 for controlling a crane according to an exemplary embodiment of the present application is configured to acquire a third speed value of the third motor 405, wherein, when the third end of the hoist moves towards the third motor 405, the third speed value is positive, and when the third end of the hoist moves away from the third motor 405, the third speed value is negative. The second speed difference acquiring unit 203 of the device 10 for controlling a crane according to an exemplary embodiment of the present application is configured to acquire a second speed difference between the first speed value and the third speed value. The second speed difference threshold acquiring unit 205 of the device 10 for controlling a crane according to an exemplary embodiment of the present application is configured to acquire a second speed difference threshold. The second PI controller 207 of the device 10 for controlling a crane according to an exemplary embodiment of the present application is configured to, if the second speed difference between the first speed value and the third speed value is smaller than the second speed difference threshold, send a control instruction to the first motor 401 to increase a torque output value of the first motor in the cart traveling direction.

It should be understood that the first motor 401 may be any one of the four anti-sway motors that pull the four ends of the hoist.

When the hoist sways in a certain direction, the motor on the opposite side of the sway direction is the "first motor" according to an embodiment of the present application. Thus, when the hoist sways in the cart traveling direction, the motor on the opposite side of the hoist sway increases the torque output, thereby controlling the amplitude of sway of the hoist in the cart traveling direction.

Figure 11:
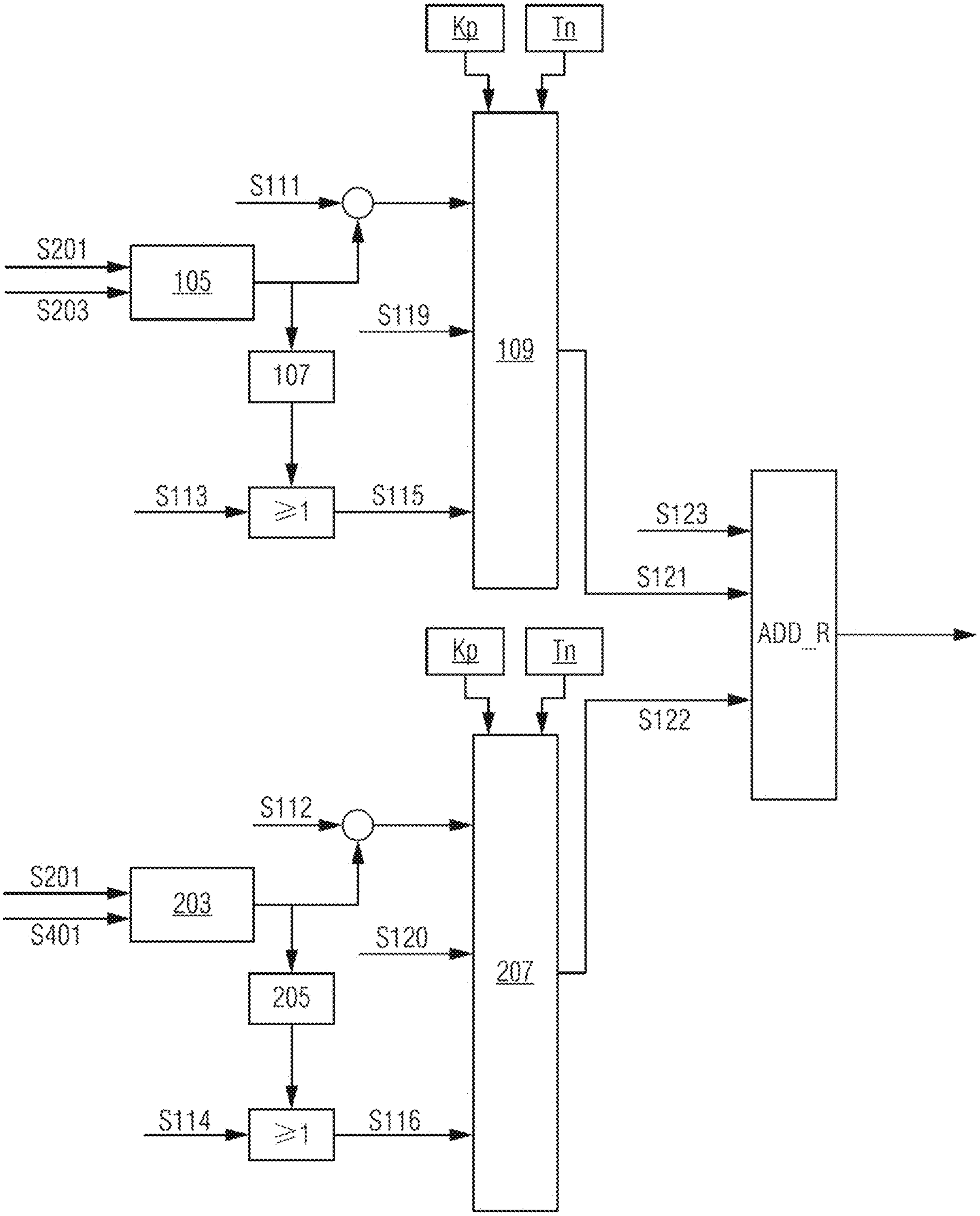
FIG. 11 is a schematic diagram for a method for preventing sway in a system for controlling a crane incorporating teachings of the present application.

The systems for controlling a crane incorporating teachings of the present application comprise a device for controlling a crane that implements a method for controlling a crane as described above, and no similar descriptions will be given again herein. FIG. 11 is a schematic diagram for a method for preventing sway in a system for controlling a crane according to an exemplary embodiment of the present application. As shown in FIG. 11, for the anti-sway process in the trolley traveling direction, a first speed value of the first motor is obtained in S201, a second speed value of the second motor is obtained in S203, and a first speed difference between the first speed value and the second speed value is obtained by the first speed difference acquiring unit 105. In Sill, a first speed difference target value, for example, 0.0, is acquired. The first speed difference threshold acquiring unit 107 acquires a first speed difference threshold. The first speed difference between the first speed value and the second speed value is compared with the first speed difference threshold; if the first speed difference is smaller than the first speed difference threshold, then the first PI controller 109 is enabled in S115 to increase the torque output value of the first motor in the trolley traveling direction. In an exemplary embodiment, if the first speed difference is greater than 0.0, the first PI controller 109 is not enabled.

In some embodiments, an enable instruction may be input by a PLC in S113 so that the first PI controller 109 is enabled in S115. A torque high limit and a torque low limit are set in S119. The first PI controller 109 automatically regulates the output torque on the basis of an input proportional parameter Kp and an integral parameter Tn, and outputs it to the first motor in S121, so as to prevent the hoist from swaying in the trolley traveling direction. In addition, in S123, the motor is controlled by a PLC to tightly stretch the rope of the hoist.

As shown in FIG. 11, for the anti-sway process in the cart traveling direction, a first speed value of the first motor is acquired in S201, a third speed value of the third motor is acquired in S401, and a second speed difference between the first speed value and the third speed value is acquired by the second speed difference acquiring unit 203. In S112, a second speed difference target value, for example 0.0, is acquired. The second speed difference threshold acquiring unit 205 acquires a second speed difference threshold. The second speed difference between the first speed value and the third speed value is compared with the second speed difference threshold; if the second speed difference is smaller than the second speed difference threshold, the second PI controller 207 is enabled in S116 to increase the torque output value of the first motor in the cart traveling direction.

In some embodiments, if the second speed difference is greater than 0.0, the second PI controller 207 is not enabled. In an exemplary embodiment, an enable instruction may be input by a PLC in S114 so that the second PI controller 207 is enabled in S116. A torque high limit and a torque low limit are set in S120. The second PI controller 207 automatically regulates the output torque on the basis of the input proportional parameter Kp and integral parameter Tn, and outputs it to the first motor in S122 to prevent the hoist from swaying in the cart traveling direction. After ADD_R, the sway of the hoist is finally prevented.

In some embodiments, as shown in FIG. 11, the given value of the first PI controller 109 and the second PI controller 207 is 0.0, and the feedback value thereof is the speed difference between the controlled motor and a motor positioned facing the sway direction of the controlled motor. The direction in which an anti-sway motor takes up the steel wire rope, that is, the lifting direction of the hoist, is defined as the positive direction of the speed, and the reverse direction is defined as the negative direction of the speed. When the speed difference is smaller than a speed difference threshold (for example, it may be set to −3.0, which may be appropriately changed on the basis of an error in the speeds of the two motors when only the hoist is lifted), the first PI controller 109 and the second PI controller 207 are enabled;

the first PI controller 109 and the second PI controller 207 will automatically regulate the output torque on the basis of the proportional parameter Kp and the integral parameter Tn.

In addition, when the speed difference is greater than a set value (which may be set to 0.0), that is, when the sway direction is reversed, the PI controller is disabled so that its output torque is 0. In an exemplary scenario, when the trolley is accelerating or decelerating, the hoist maintains a certain angle (in a position having the maximum sway, when the speed difference is about 0) to achieve a matching acceleration; in this case, the first PI controller 109 may be enabled by a PLC; for example, an enable instruction is input in S113, and the first PI controller 109 is enabled in S115 so that the anti-sway function of the first PI controller 109 remains effective. A torque high limit and a torque low limit are set in S119 and S120. Since the steel wire rope by which an anti-sway motor pulls the hoist needs to be kept tightly stretched all the time, it is recommended that the set output torque of a PI controller be not smaller than 0; therefore, the torque low limit of the first PI controller 109 and of the second PI controller 207 is set to 0.0. Depending on whether the trolley and the cart operate separately or in conjunction, the torque high limit of the first PI controller 109 and of the second PI controller 207 in the trolley direction and the cart direction is set to 50-100, which is controlled by PLC output.

See FIG. 6 and FIG. 11; taking, as an example, the anti-sway motor a and the anti-sway motor b that is positioned opposite to the sway direction of the hoist when the cart is traveling, when the cart accelerates, the hoist sways from position V to position W; in this case, the speed of the anti-sway motor a is smaller than 0, and the speed of the anti-sway motor b is greater than 0; therefore, the speed difference between the anti-sway motor a and the anti-sway motor b is negative, and the second PI controller 207 outputs a matching torque output value to the anti-sway motor a to reduce the amplitude of sway. The speed difference between the anti-sway motor b and the anti-sway motor a is positive, and the torque output by the second PI controller 207 to the anti-sway motor b is 0; even if the second PI controller 207 keeps being enabled by a PLC, when the speed difference turns positive, the torque output of the second PI controller 207 quickly decreases until it reaches the torque low limit=0.0. Likewise, when the cart has just started traveling at a constant speed after acceleration, the hoist sways from position W to position V; at this point, the speed of the anti-sway motor b is smaller than 0, and the speed of the anti-sway motor a is greater than 0. Therefore, the speed difference between the anti-sway motor b and the anti-sway motor a is negative, and the second PI controller 207 outputs a matching torque output value to the anti-sway motor b, so that the hoist slowly sways back to the base point. The speed difference between the anti-sway motor a and the anti-sway motor b is positive, and the output torque of the second PI controller 207 to the anti-sway motor a is 0; even if the second PI controller 207 keeps being enabled by a PLC, when the speed difference turns positive, the torque output of the second PI controller 207 quickly decreases until it reaches the torque low limit=0.0. Therefore, although the four anti-sway motors run the same control program, when the hoist is in different sway positions, respective controlled torques of the four motors can fully adapt to the torque required by each sway position.

In some embodiments, a storage medium comprises a stored program that when run, controls a device where the storage medium is located to implement one or more of the methods of the present application. In some embodiments, a processor is configured to run a program that, when executed, implements one or more methods of the present application. In some embodiments, a terminal comprises: one or more processors, a memory, and one or more programs, wherein said one or more programs are stored in the memory and configured to be executed by said one or more processors, said one or more programs comprising instructions for implementing one or more of the methods of the present application. In some embodiments, a computer program product is tangibly stored on a computer-readable medium and comprising a computer-executable instruction that, when executed, causes at least one processor to implement one or more of the methods of the present application. Thus, when the hoist sways, the motor on the opposite side of the hoist sway increases the torque output, thereby controlling an amplitude of sway of the hoist.

With an anti-sway system incorporating teachings of the present application, debugging is simple, few parameters need to be changed or adjusted, and a good control effect is still produced even when default parameters are used; this allows saving of considerable debugging time to improve the debugging efficiency. With an anti-sway system according to an embodiment of the present application, the anti-sway effect remains unaffected when various mechanisms of the hoist, the trolley, and the cart are operated in conjunction.

A set torque value of an anti-sway system incorporating teachings of the present application is automatically regulated by the output of a PI controller, without the need to consider the load on the hoist. Since a speed difference is used as the controlled quantity, the controlled quantity remains little affected regardless of whether the lifting mechanism is operated while the trolley or cart is traveling. Therefore, the controlled quantity can accurately reflect a sway situation without being affected by the simultaneous operation of the lifting mechanism, which ensures that the anti-sway effect remains unaffected. Since the steel wire rope remains tightly stretched under the control of a motor, a speed difference arises once sway occurs, and thus sway caused by external disturbance may be prevented effectively. Like speed closed-loop control, due to a deviation between a set value and a feedback value, a PI controller automatically regulates the output torque until the deviation between the set value and the feedback value becomes 0; thus, the torque may be regulated very appropriately without considering the magnitude of the hoist load. In each of the above-described embodiments of the present application, particular emphasis is put on a respective aspect; for a part not detailed in an embodiment, reference may be made to relevant descriptions in other embodiments.

It should be understood that the technical contents disclosed in the embodiments provided by the present application may be implemented by other methods. The above-described device embodiment is only illustrative. For example, the division of said units or modules is only logical function division, and an alternative division method may be employed in actual implementation. For example, a plurality of units or modules may be combined or integrated into another system, or certain characteristics may be ignored or not be executed. In addition, the shown or discussed mutual coupling or direct coupling or communication connection may be established via certain interfaces, and indirect coupling or communication connection between modules or units may be electrical or in any other form.

Said units or modules described as separate components may or may not be physically separated. Components shown as units or modules may or may not be physical units or modules; in other words, they may be located in the same place or may be distributed on a plurality of network units or modules. An objective of the technical solution of an embodiment may be achieved by selecting some or all of the units or modules based on actual needs.

Further, the functional units or modules in each embodiment of the present application may be integrated in one processing unit or module, or each of the functional units or modules may exist physically and separately, or two or more units or modules may be integrated in one unit or module. Said integrated unit or module may be implemented in the form of hardware or may be implemented in the form of a software functional unit or module.

To be implemented in the form of a software functional unit and sold or used as a standalone product, said integrated unit may be stored in a computer-readable storage medium. Based on such an understanding, the technical solution of the present application essentially, or for a part contributing to the prior art, or for all or part of the technical solution, may be embodied in the form of a software product. The computer software product is stored in a storage medium, comprising a plurality of instructions for causing a computer device (a personal computer, server, network device, etc.) to execute all or part of the steps of the method described in each embodiment of the present application. Examples of the above-described storage medium include USB drive, Read-Only Memory (ROM), Random Access Memory (RAM), movable hard disk, magnetic disk, CD-ROM, or any other medium that can store program code. While the present application has been particularly described above with reference to preferred embodiments, it should be understood that those of ordinary skill in the art can make various improvements and modifications without departing from the principle of the present application, and such improvements and modifications should also be deemed to fall into the protection scope of the present application.

What is claimed is:

1. A method for controlling a crane, the method comprising:

acquiring a first speed value of a first motor configured to pull a first end of a hoist of the crane, wherein, when the first end of the hoist moves toward the first motor, the first speed value is positive, and when the first end of the hoist moves away from the first motor, the first speed value is negative;

acquiring a second speed value of the second motor configured to pull a second end of the hoist of the crane, the second end being the opposite end of the first end in a trolley traveling direction of the crane, wherein, when the second end of the hoist moves toward the second motor, the second speed value is positive, and when the second end of the hoist moves away from the second motor, the second speed value is negative;

acquiring a first speed difference between the first speed value and the second speed value;

acquiring a first speed difference threshold; and if the first speed difference is smaller than the first speed difference threshold, sending a control instruction to the first motor to increase a torque output value of the first motor in the trolley traveling direction.

2. The method as claimed in claim 1, further comprising:

acquiring a third speed value of a third motor configured to pull a third end of the hoist of the crane, the third end being the opposite end of the first end in a cart traveling direction of the crane, wherein, when the third end of the hoist moves toward the third motor, the third speed value is positive, and when the third end of the hoist moves away from the third motor, the third speed value is negative;

acquiring a second speed difference between the first speed value and the third speed value;

acquiring a second speed difference threshold; and if the second speed difference between the first speed value and the third speed value is smaller than the second speed difference threshold, sending a control instruction to the first motor to increase a torque output value of the first motor in the cart traveling direction.

3. The method as claimed in claim 2, further comprising acquiring a second speed difference target value;

wherein increasing a torque output value of the first motor in the cart traveling direction comprises increasing a torque output value of the first motor until a second speed difference between the first speed value and the third speed value reaches the second speed difference target value.

4. The method as claimed in claim 1, further comprising acquiring a first speed difference target value, wherein increasing a torque output value of the first motor in the trolley traveling direction comprises increasing a torque output value of the first motor until a first speed difference between the first speed value and the second speed value reaches the first speed difference target value.

5. The method as claimed in claim 1, further comprising acquiring an enable instruction, the enable instruction being used to allow a control instruction to be sent to the first motor to increase a torque output value of the first motor.

6. The method as claimed in claim 1, further comprising acquiring a torque high limit and a torque low limit;

wherein a torque output value of the first motor is limited to not exceed the torque high limit or the torque low limit.

7. The method as claimed in claim 6, further comprising, if the first speed difference between the first speed value and the second speed value is greater than zero, sending a control instruction to the first motor to reduce a torque output value of the first motor in the trolley traveling direction.

8. The method as claimed in claim 6, further comprising, if the second speed difference between the first speed value and the third speed value is greater than zero, sending a control instruction to the first motor to reduce a torque output value of the first motor in the cart traveling direction.

9. The method as claimed in claim 1, further comprising acquiring a proportional parameter and an integral time, wherein a torque output value of the first motor is regulated on the basis of the proportional parameter and the integral time.

10. A device for controlling a crane, the device comprising:

a first speed acquiring unit to acquire a first speed value of a first motor, the first motor being configured to pull a first end of a hoist of the crane, wherein, when the first end of the hoist moves toward the first motor, the first speed value is positive, and when the first end of the hoist moves away from the first motor, the first speed value is negative;

a second speed acquiring unit to acquire a second speed value of a second motor, the second motor being configured to pull a second end of the hoist of the crane, the second end being the opposite end of the first end in a trolley traveling direction of the crane, wherein, when the second end of the hoist moves toward the second motor, the second speed value is positive, and when the second end of the hoist moves away from the second motor, the second speed value is negative;

a first speed difference acquiring unit to acquire a first speed difference between the first speed value and the second speed value;

a first speed difference threshold acquiring unit to acquire a first speed difference threshold; and a first PI controller programmed to, if the first speed difference between the first speed value and the second speed value is smaller than the first speed difference threshold, send a control instruction to the first motor to increase a torque output value of the first motor in the trolley traveling direction.

11. The device as claimed in claim 10, further comprising:

a third speed acquiring unit to acquire a third speed value of a third motor, the third motor being configured to pull a third end of the hoist of the crane, the third end being the opposite end of the first end in a cart traveling direction of the crane, wherein, when the third end of the hoist moves toward the third motor, the third speed value is positive, and when the third end of the hoist moves away from the third motor, the third speed value is negative;

a second speed difference acquiring unit configured to acquire a second speed difference between the first speed value and the third speed value;

a second speed difference threshold acquiring unit configured to acquire a second speed difference threshold; and a second PI controller programmed to, if the second speed difference between the first speed value and the third speed value is smaller than the second speed difference threshold, send a control instruction to the first motor to increase a torque output value of the first motor in the cart traveling direction.

12. The device as claimed in claim 11, further comprising a second target value acquiring unit configured to acquire a second speed difference target value, wherein increasing a torque output value of the first motor in the cart traveling direction comprises increasing a torque output value of the first motor until a second speed difference between the first speed value and the third speed value reaches the second speed difference target value.

13. The device as claimed in claim 10, further comprising a first target value acquiring unit configured to acquire a first speed difference target value, wherein increasing a torque output value of the first motor in the trolley traveling direction comprises increasing a torque output value of the first motor until a first speed difference between the first speed value and the second speed value reaches the first speed difference target value.

14. The device as claimed in claim 10, further comprising an enable instruction acquiring unit configured to acquire an enable instruction, the enable instruction being used to allow a control instruction to be sent to the first motor to increase a torque output value of the first motor.

15. The device as claimed in claim 10, further comprising a limit value acquiring unit configured to acquire a torque high limit and a torque low limit;

wherein a torque output value of the first motor is limited to not exceed the torque high limit or the torque low limit.

16. The device as claimed in claim 10, further comprising a regulation parameter acquiring unit to acquire a proportional parameter and an integral time;

wherein a torque output value of the first motor is regulated on the basis of the proportional parameter and the integral time.

17. A system for controlling a crane, the system comprising:

a first motor to pull a first end of a hoist of a crane;

a second motor to pull a second end of the hoist of the crane, the second end being the opposite end of the first end in a trolley traveling direction of the crane;

a device comprising:

a first speed acquiring unit to acquire a first speed value of the first motor, wherein, when the first end of the hoist moves toward the first motor, the first speed value is positive, and when the first end of the hoist moves away from the first motor, the first speed value is negative;

a second speed acquiring unit to acquire a second speed value of the second motor, wherein, when the second end of the hoist moves toward the second motor, the second speed value is positive, and when the second end of the hoist moves away from the second motor, the second speed value is negative;

a first speed difference acquiring unit to acquire a first speed difference between the first speed value and the second speed value;

a first speed difference threshold acquiring unit to acquire a first speed difference threshold; and a first PI controller programmed to, if the first speed difference between the first speed value and the second speed value is smaller than the first speed difference threshold, send a control instruction to the first motor to increase a torque output value of the first motor in the trolley traveling direction.

18. The system as claimed in claim 17, further comprising a third motor configured to pull a third end of the hoist of a crane, the third end being the opposite end of the first end in a cart traveling direction of the crane;

wherein the device further comprises:

a third speed acquiring unit to acquire a third speed value of the third motor, wherein, when the third end of the hoist moves toward the third motor, the third speed value is positive, and when the third end of the hoist moves away from the third motor, the third speed value is negative;

a second speed difference acquiring unit to acquire a second speed difference between the first speed value and the third speed value;

a second speed difference threshold acquiring unit to acquire a second speed difference threshold; and a second PI controller programmed to, if the second speed difference between the first speed value and the third speed value is smaller than the second speed difference threshold, send a control instruction to the first motor to increase a torque output value of the first motor in the cart traveling direction.

* * * * *